(12) United States Patent
Antonille et al.

(10) Patent No.: US 8,092,031 B2
(45) Date of Patent: Jan. 10, 2012

(54) SYSTEMS AND METHODS FOR MIRROR MOUNTING WITH MINIMIZED DISTORTION

(75) Inventors: Scott R. Antonille, Beltsville, MD (US); Thomas E. Wallace, Parkton, MD (US); David A. Content, Bowie, MD (US); Shane W. Wake, Silver Spring, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 364 days.

(21) Appl. No.: 12/569,090

(22) Filed: Sep. 29, 2009

(65) Prior Publication Data

US 2010/0226028 A1   Sep. 9, 2010

Related U.S. Application Data

(60) Provisional application No. 61/157,065, filed on Mar. 3, 2009.

(51) Int. Cl.
  *G02B 7/182* (2006.01)
(52) U.S. Cl. ...................................................... 359/871
(58) Field of Classification Search .................. 359/871, 359/872, 399
  See application file for complete search history.

(56) References Cited

U.S. PATENT DOCUMENTS

| | | | |
|---|---|---|---|
| 6,738,147 B2 * | 5/2004 | Yafuso | 356/508 |
| 7,679,845 B2 * | 3/2010 | Wang | 359/822 |
| 2004/0223205 A1 * | 11/2004 | Aoyama et al. | 359/223 |

* cited by examiner

*Primary Examiner* — Euncha Cherry
(74) *Attorney, Agent, or Firm* — Christopher O. Edwards (57) ABSTRACT

A method for mounting a mirror for use in a telescope includes attaching the mirror to a plurality of adjustable mounts; determining a distortion in the mirror caused by the plurality adjustable mounts, and, if the distortion is determined to be above a predetermined level: adjusting one or more of the adjustable mounts; and determining the distortion in the mirror caused by the adjustable mounts; and in the event the determined distortion is determined to be at or below the predetermined level, rigidizing the adjustable mounts.

20 Claims, 6 Drawing Sheets

FIG. 5 ps://patents.google.com/patent/US8092031B2/en

SYSTEMS AND METHODS FOR MIRROR MOUNTING WITH MINIMIZED DISTORTION

BACKGROUND

The disclosure described herein was developed by employees of the United States Government and may be manufactured and used by or for the United States Government for governmental purposes without the payment of any royalties thereon or therefore.

This disclosure relates generally to the field of telescope mirrors.

Telescopes in space use large mirrors to capture images; the surface figure of a telescope mirror must precisely conform to specified dimensions in order to capture images clearly. Therefore, distortion in a telescope mirror needs to be minimized. Fabrication and testing of such a mirror on earth may be complicated by the presence of distortion in the mirror due the mirror's own weight at 1 g; this self-weight distortion is not present in space in the absence of gravity (i.e., at 0 g). The mounts that hold the mirror in place in the telescope may also induce stress and distortion in the mirror; any distortion induced by the mirror mounts will be present both on earth and in space. Mounting methods that theoretically produce little or no mirror distortion exist, but such methods may be irreversible if distortion is seen in the mirror after mounting, and may employ interfaces that are not compatible with extreme space environments.

To increase telescope resolution, the telescope's primary aperture may be increased by increasing the mirror size. The mirror size is limited by the total mass that may be successfully launched into space, particularly for missions having a high-energy orbit. Lightweighting the mirror material allows for launching of a correspondingly larger mirror into space; however, as the mirror material is made more lightweight, the stiffness of the mirror material decreases, resulting in greater distortion in the mirror from gravity and from the mirror mounting. Reduced mirror stiffness increases the cost and risk associated with the fabrication, validation, integration, and verification of a lightweight mirror with a high-precision on-orbit surface figure.

BRIEF SUMMARY

An exemplary embodiment of a method for mounting a mirror for use in a telescope includes attaching the mirror to a plurality of adjustable mounts; determining a distortion in the mirror caused by the plurality adjustable mounts, and, if the distortion is determined to be above a predetermined level: adjusting one or more of the adjustable mounts; and determining the distortion in the mirror caused by the adjustable mounts; and in the event the determined distortion is determined to be at or below the predetermined level, rigidizing the adjustable mounts.

An exemplary embodiment of a system for mounting a mirror for use in a telescope includes a plurality of adjustable mounts attached to the mirror; an interferometer configured to determine a distortion in the mirror caused by the plurality adjustable mounts; wherein one or more of the plurality of adjustable mounts are configured to be adjusted in the event the distortion is determined to be above a predetermined level, and the plurality of adjustable mounts are configured to be rigidized in the event the determined distortion is determined to be at or below the predetermined level.

An exemplary embodiment of a computer program product comprising a computer readable storage medium containing computer code that, when executed by a computer, implements a method for mounting a mirror for use in a telescope, the mirror being attached to a plurality of adjustable mounts, wherein the method including determining a distortion in the mirror caused by the plurality adjustable mounts, and, if the distortion is determined to be above a predetermined level: adjusting one or more of the adjustable mounts; and determining the distortion in the mirror caused by the adjustable mounts; and in the event the determined distortion is determined to be at or below the predetermined level, issuing a command to rigidize the adjustable mounts.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of systems and methods for mirror mounting with minimized distortion are provided, with exemplary embodiments being discussed below in detail. Identification and separation of the distortion due to gravity in the mirror from the distortion induced by the mirror mounts allows for minimization of the distortion from the mirror mounts. Further, distortion testing during the mounting process allows for adjustment of the mounts to correct distortion that is detected in the mounted mirror. The mirror mounting may survive a launch environment and prevent damage to the mirror under launch conditions. The mirror mount and associated mirror mounting process may be used for any precision lightweighted optic that needs to withstand a harsh launch environment and operate in a zero gravity environment, including but not limited to earth-observing systems, optics used in space exploration, and space-borne astronomical observatories.

A mirror mount and an associated mirror mounting process may enable ultra-lightweighted high-precision mirrors to be mounted with minimal distortion. In-situ measurement and minimization of small (nanometer sized) zero gravity mirror figure distortions from the mirror mounting may be performed in the presence of larger gravity induced mirror distortions. The resulting distortion from the mounts may be below length scales of several nanometers (root-mean-squared, over the optical aperture), providing an on-orbit, or zero-gravity, mirror surface figure verification during on-earth testing in the presence of much larger self-weight gravity distortions. The self-weight distortion may range in magnitude between ten and one hundred times larger than operational surface figure tolerances. Iterative analysis, isolation, and correction of any mirror distortions during the mounting process may be performed before the mount is irreversibly locked into place.

Figure 1:
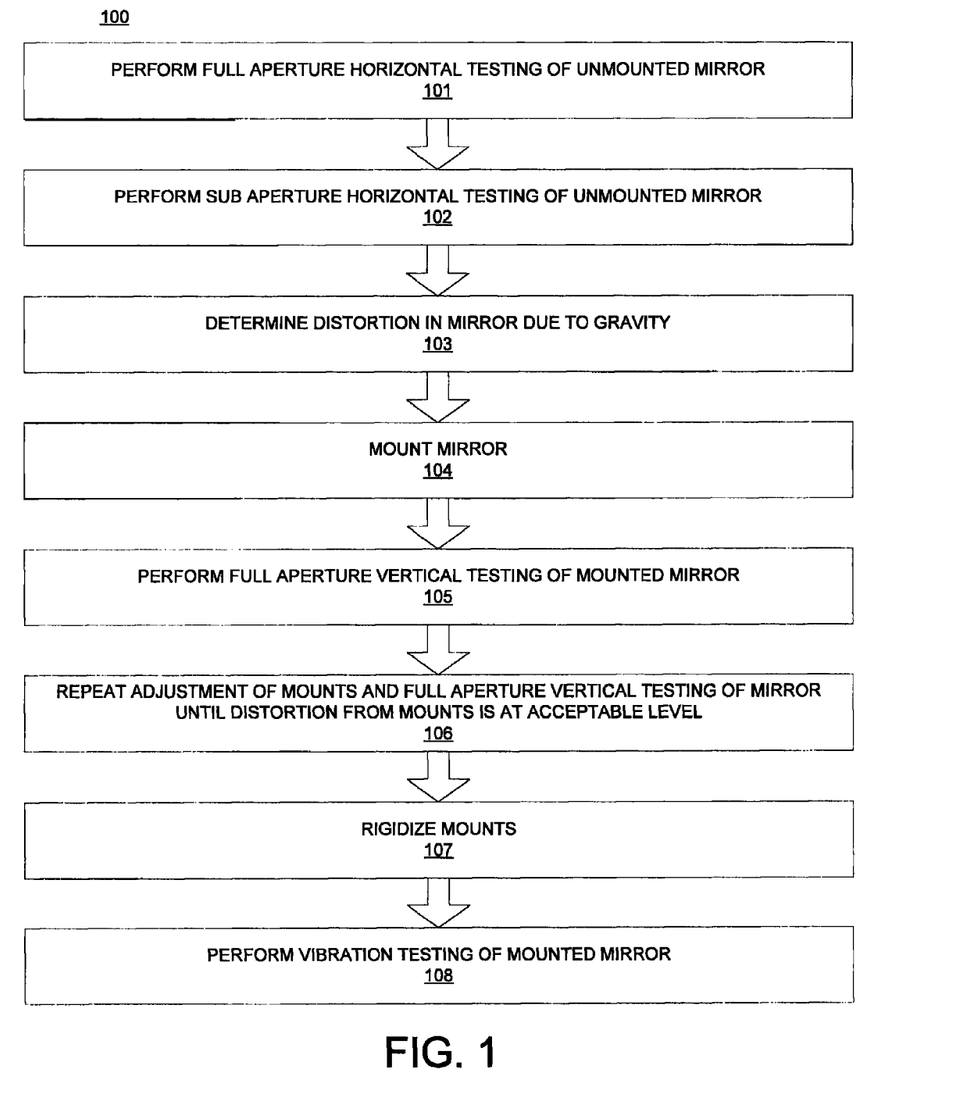
FIG. 1 illustrates an embodiment of a method for mirror mounting with minimized distortion.

FIG. 1 illustrates an embodiment of a method 100 for mirror mounting with minimized distortion. In block 101, a full-aperture horizontal test of the unmounted mirror is performed. Full aperture horizontal testing is described in further detail below with respect to FIG. 2. In block 102, a sub-aperture horizontal test of the unmounted mirror is performed. Sub-aperture horizontal testing is described in further detail below with respect to FIG. 3. In block 103, distortion in the mirror due to gravity is determined based on finite element modeling and the combined results of the full-aperture and sub-aperture horizontal tests. In block 104, the mirror is mounted. In block 105, a full-aperture vertical test of the mounted mirror is performed. Full aperture vertical testing of the mounted mirror is described in further detail below with respect to FIG. 4. In block 106, the mounts are adjusted as necessary based on the vertical test results, and full aperture vertical testing is performed on the adjusted mirror to determine the degree of distortion in the mirror from the adjusted mounts. Adjustment and testing of the mounts and mirror may be repeated until the distortion induced in the mirror by the mounts is determined to be at or below an acceptable level. In block 107, the adjusted mounts are rigidized. As used herein, rigidize means to irreversibly lock into place. In block 108, vibration testing of the rigidized mounted mirror is performed.

Figure 2:
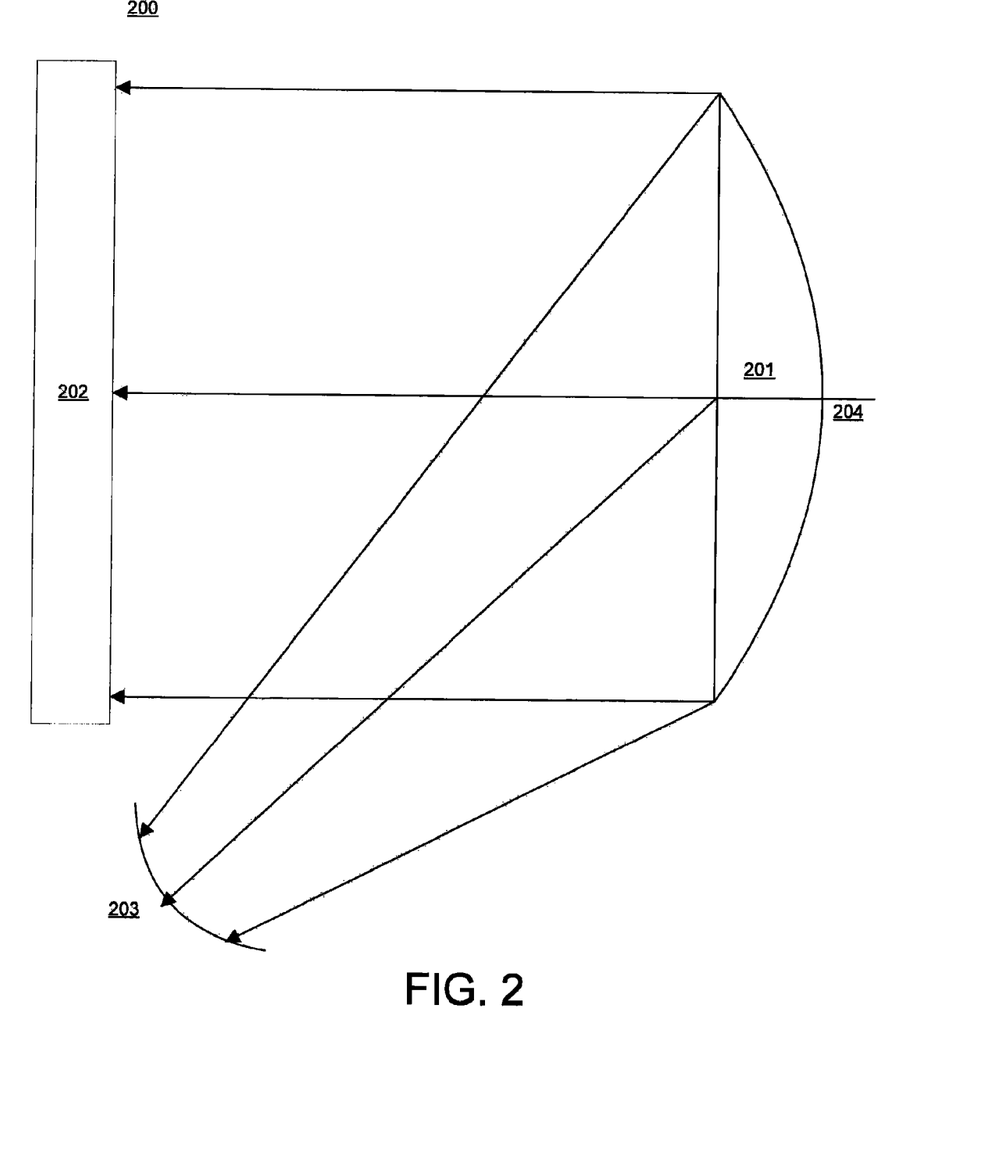
FIG. 2 illustrates an embodiment of a system for a full aperture horizontal test for an unmounted mirror.

An embodiment of a system 200 for a full-aperture horizontal test of an unmounted mirror is illustrated in FIG. 2. Interferometer 202 focuses a beam on mirror 201; the beam is reflected from mirror 201 to reference sphere 203, which reflects the beam back to mirror 201. Mirror 201 then reflects the beam back to interferometer 202. Distortion in mirror 201 may be determined based on the reflected beam received at interferometer 202. The mirror 201 and the reference sphere 203 are aligned to minimize tilt, power, astigmatism, and coma. Mirror 201 is configured to rotate around axis 204. The test comprises an n-position test, allowing for measurement of mirror features that are not symmetric under n-fold rotation; in some embodiments, measurements may be taken at 24 different positions separated by about 15° each. After each measurement the mirror 201 is rotated to the next position and realigned. Interferometer 202 may comprise a 60 cm aperture wavelength shifting Fizeau interferometer with a horizontally collimated beam. Reference sphere 203 may comprise a confocal, high precision reference sphere.

Mirror distortion due to gravity may be modeled for the mirror 201 using finite element modeling (FEM) and subtracted from the test data. The full-aperture horizontal measurements capture sag variations in mirror 201 as the gravity vector rotates 360° in the plane normal to the optical axis 204, allowing for the direct measurement of sag at 1 g, and an accuracy assessment of the sag prediction of the finite element model (FEM). The sag symmetry determined by the full-aperture horizontal test may provide data less sensitive to model uncertainties compared to data collected at a single mirror-to-gravity orientation.

Figure 3A:
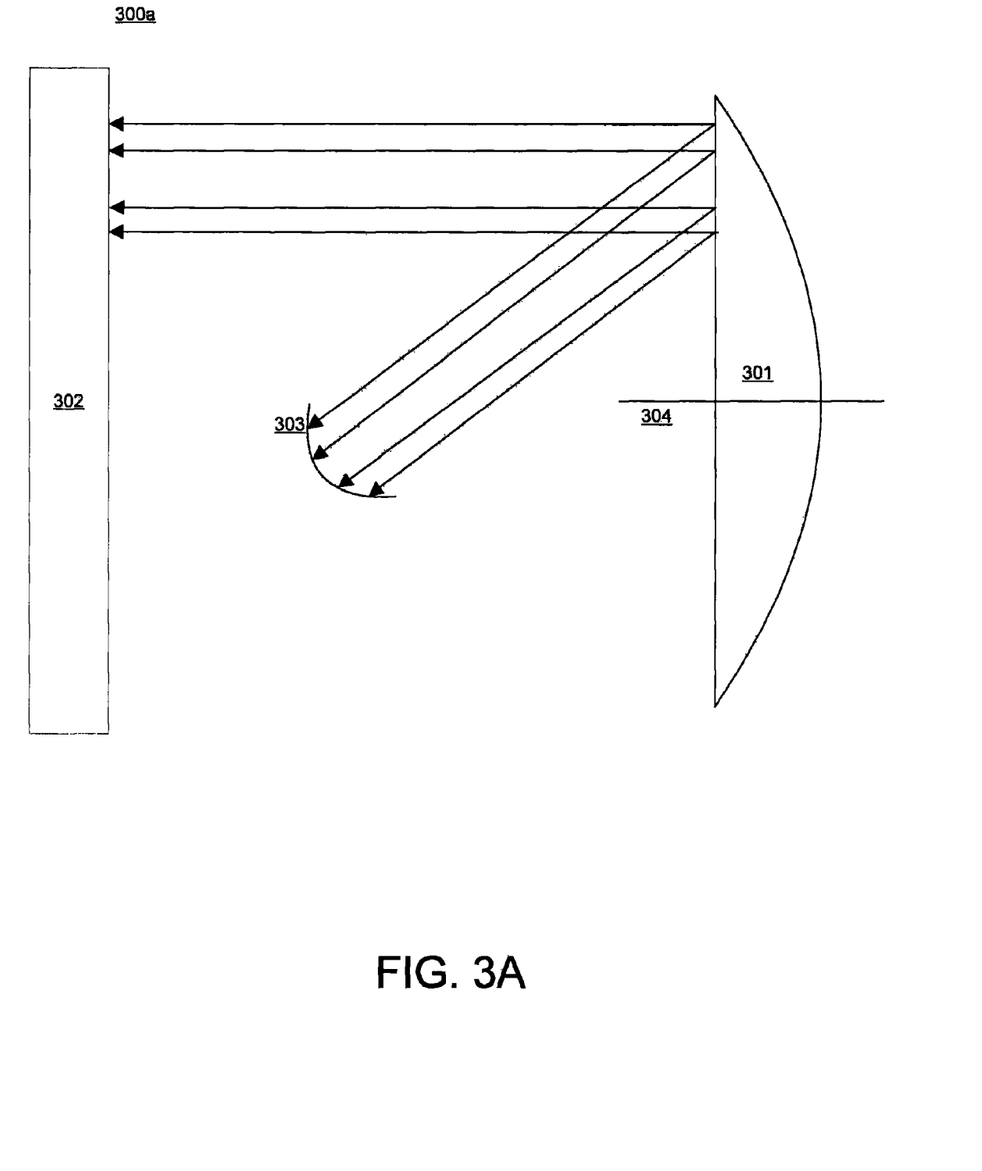
FIG. 3a illustrates an embodiment of a side view of system for a sub-aperture horizontal test for an unmounted mirror.
Figure 3B:
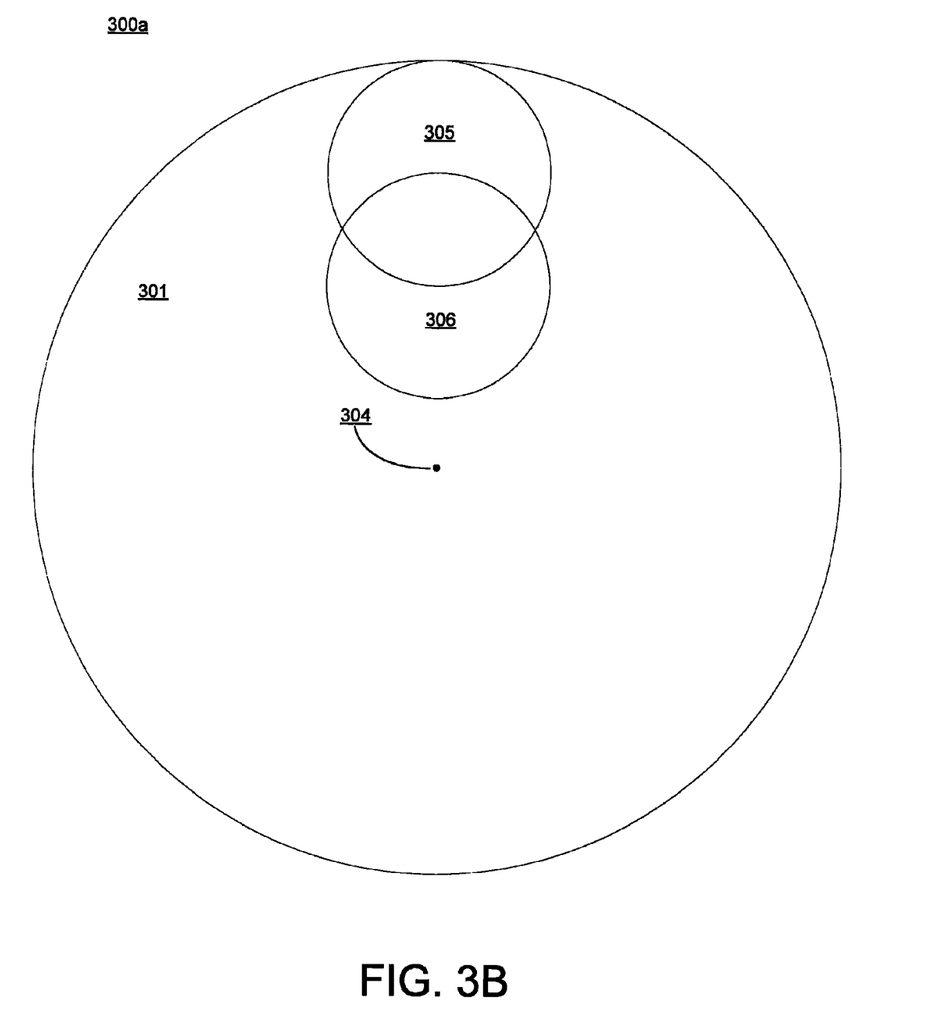
FIG. 3b illustrates an embodiment of a front view of a system for a sub-aperture horizontal test of an unmounted mirror.

An embodiment of a system 300a-b for a sub-aperture horizontal test of an unmounted mirror is illustrated in FIGS. 3A-B, showing a side view and a front view, respectively. The sub-aperture horizontal test may capture spatial frequencies that are not measured in the full-aperture test illustrate in FIG. 2. Referring to FIG. 3A, interferometer 302 focuses a beam corresponding to an outer ring and a beam corresponding to an inner ring on mirror 301; the beams are reflected from mirror 301 to reference sphere 303, which reflects the beams back to mirror 301. Mirror 301 then reflects the beams back to interferometer 302. Distortion in mirror 301 may be determined based on the reflected inner and outer ring beams received at interferometer 302. Mirror 301 is configured to rotate around axis 304. The test may comprise an n-position test, allowing for measurement of mirror features that are not symmetric under n-fold rotation, in some embodiments, measurements may be taken at 24 positions separated by increments of about 15°. Interferometer 302 may comprise a 150 mm reference flat configured to illuminate an off-axis section of mirror 301. The sub-aperture is tested in an auto-collimating configuration.

FIG. 3B shows an embodiment 300b of an outer ring beam 305 and an inner ring beam 306 illuminated on mirror 301 in a single test position. The illuminated sub-apertures stay at the same off-axis radius at each of the n test positions, creating a ring of overlapping measurements. As mirror 301 is rotated to the various test positions around central axis 304, the inner and outer sub-apertures 305 and 306 cover the full aperture of mirror 301, with significant overlap between each sub-aperture. Each sub-aperture measurement is aligned to minimize tilt, coma, and astigmatism. Sub-apertures 305 and 306 are shown for illustrative purposes only, any appropriate number of sub apertures may be used to illuminate the surface of mirror 301. The inner and outer rings cover the full aperture, with significant overlap between each sub-aperture. Each sub-aperture measurement is aligned to minimized tilt, coma, and astigmatism. A stitching algorithm may be used to average the sub-aperture measurement results over the surface of mirror 301. The sub-aperture measurements cover mid-spatial frequency bands where roughness measurements and full-aperture interferometry lack full sensitivity, in particular, frequencies below the Nyquist limit of the vertical computer generated hologram (CGH) test (discussed below with respect to FIG. 4) or near known instrument noise levels in the horizontal full-aperture test.

Figure 4:
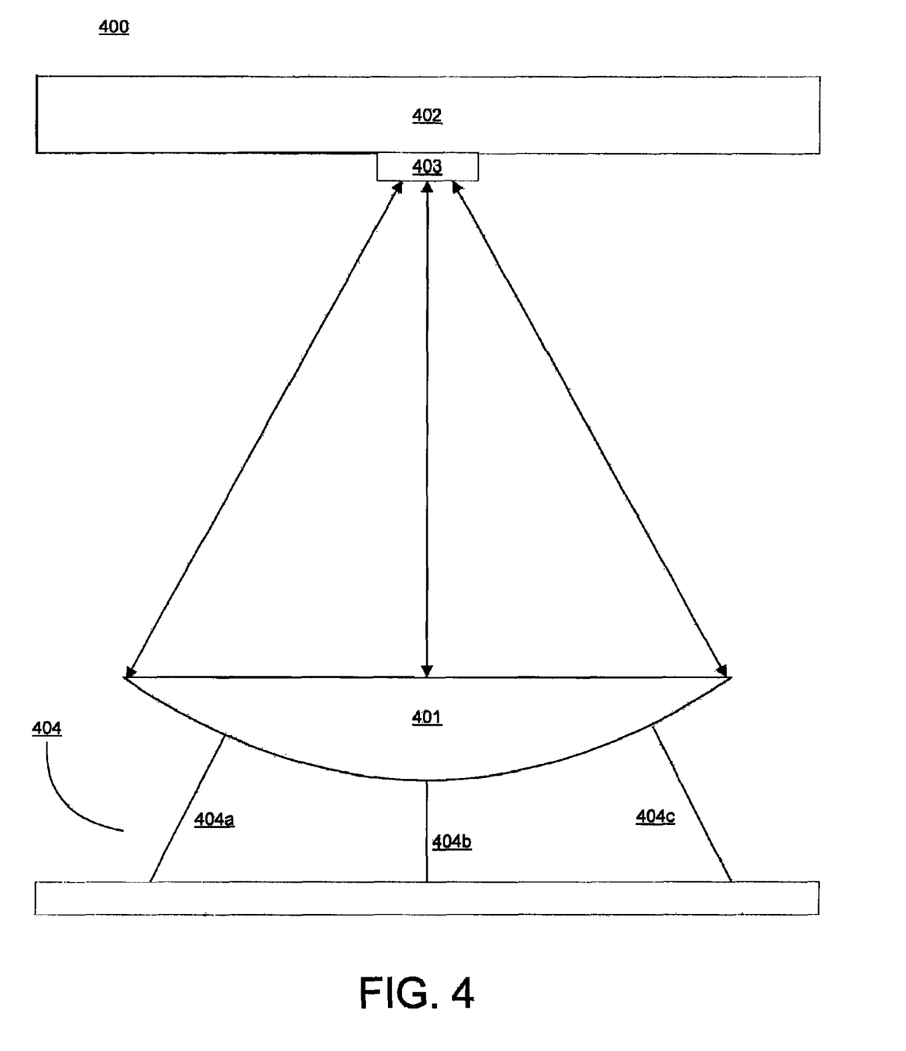
FIG. 4 illustrates an embodiment of a system for a full aperture vertical test of a mounted mirror.

An embodiment of a system 400 for a full-aperture vertical test of a mounted mirror 401 is illustrated in FIG. 4. Mirror mounting 404 may comprise a plurality of mount pads attached to joints 404a-c; the joints 404a-c may comprise ball and socket joints. Joints 404a-c is shown for illustrative purposes only; mirror mounting 404 may comprise any appropriate number and type of joints. Joints 404a-c are adjustable; the mounting of the mirror may be performed by attaching a socket end of each ball and socket joint 404a-c to a respective mount pad located on mirror 401. Interferometer 402 is positioned above mirror 401, with a CGH 403 acting as a null lens. Interferometer 402 focuses a beam on mirror 401; the beam is reflected back to interferometer 402, and data regarding distortion in the mirror 401 may be determined from the reflected beam. Measurements may be taken with the mirror in various orientations about optical axis 406. By tracking features that rotate with the mirror, any rotationally asymmetric distortion may be determined. 12 different positions may be used in some embodiments, each separated by about 30°. The distortion due to gravity in mirror 401 as determined by the full-aperture and sub-aperture horizontal tests may be subtracted from the distortion detected by the full-aperture vertical test; this allows for isolation and correction of distortion in the mirror induced by mounting 404.

Screws may be used to attach the mount pads to the mirror 401, the screws may be tightened to a degree determined to minimize distortion in mirror 401, as determined by the test measurements. The joints 404a-c may be adjusted to correct detected distortion, and further full-aperture vertical testing may be performed. Iterative analysis, isolation, and correction of any mirror distortions due to the mounting 404 may be repeated until distortion due to the mirror mounting 404 in mirror 401 is determined to be at or below an acceptable level, at which point the joints 404a-c that comprise mounting 404 are rigidized; as used herein, rigidize means to irreversibly lock into place.

Figure 5:
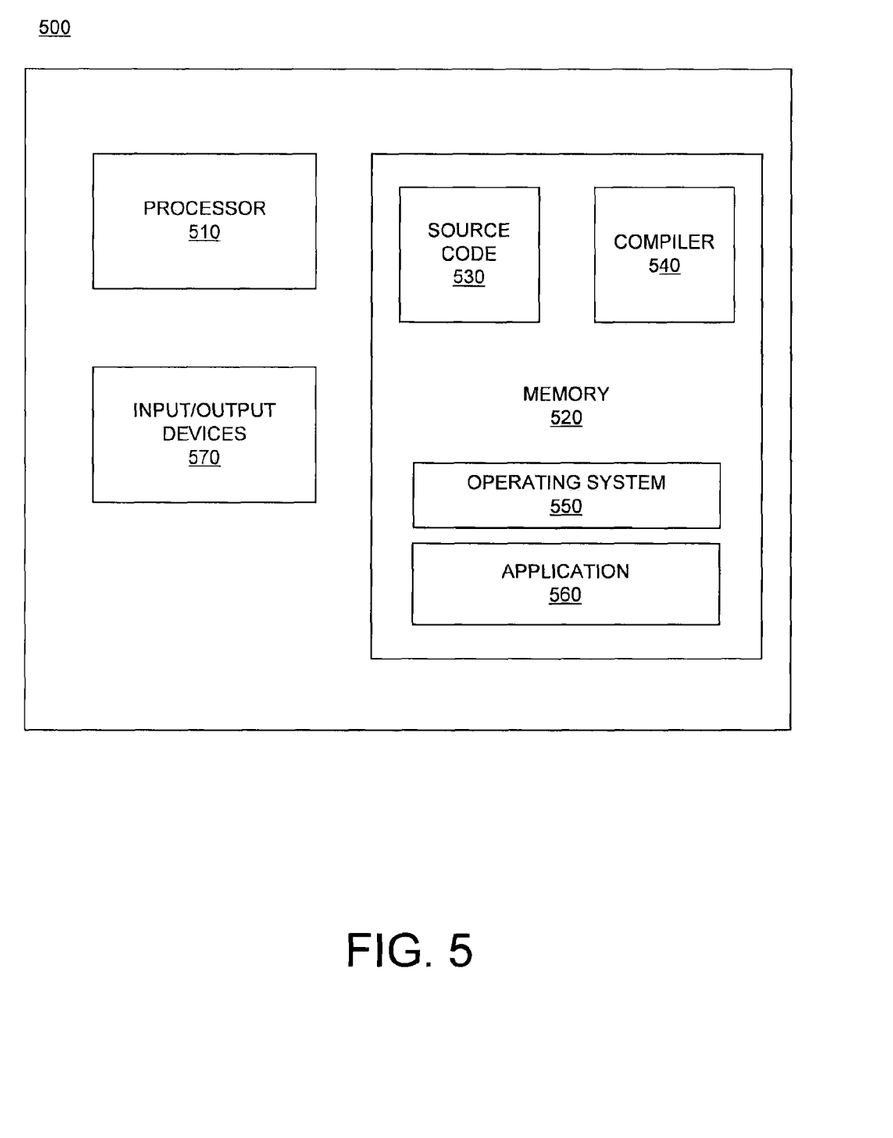
FIG. 5 illustrates an embodiment of a computer that may be used in conjunction with systems and methods for mirror mounting with minimized distortion.

FIG. 5 illustrates an example of a computer 500 having capabilities, which may be utilized by exemplary embodiments of systems and methods for mirror mounting with minimized distortion as embodied in software. Various operations discussed above may utilize the capabilities of the computer 500. One or more of the capabilities of the computer 500 may be incorporated in any element, module, application, and/or component discussed herein.

The computer 500 includes, but is not limited to, PCs, workstations, laptops, PDAs, palm devices, servers, storages, and the like. Generally, in terms of hardware architecture, the computer 500 may include one or more processors 510, memory 520, and one or more input and/or output (I/O) devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a data signal processor (DSP), or an auxiliary processor among several processors associated with the computer 500, and the processor 510 may be a semiconductor based microprocessor (in the form of a microchip) or a macroprocessor.

The memory 520 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the memory 520 may include one or more separate programs, each of which comprises an ordered listing of executable instructions for implementing logical functions. The software in the memory 520 includes a suitable operating system (O/S) 550, compiler 540, source code 530, and one or more applications 560 in accordance with exemplary embodiments. As illustrated, the application 560 comprises numerous functional components for implementing the features and operations of the exemplary embodiments. The application 560 of the computer 500 may represent various applications, computational units, logic, functional units, processes, operations, virtual entities, and/or modules in accordance with exemplary embodiments, but the application 560 is not meant to be a limitation.

The operating system 550 controls the execution of other computer programs, and provides scheduling, input-output control, file and data management, memory management, and communication control and related services. It is contemplated by the inventors that the application 560 for implementing exemplary embodiments may be applicable on all commercially available operating systems.

Application 560 may be a source program, executable program (object code), script, or any other entity comprising a set of instructions to be performed. When a source program, then the program is usually translated via a compiler (such as the compiler 540), assembler, interpreter, or the like, which may or may not be included within the memory 520, so as to operate properly in connection with the O/S 550. Furthermore, the application 560 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 570 may include input devices such as, for example but not limited to, a mouse, keyboard, scanner, microphone, camera, etc. Furthermore, the I/O devices 570 may also include output devices, for example but not limited to a printer, display, etc. Finally, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 570 also include components for communicating over various networks, such as the Internet or intranet.

If the computer 500 is a PC, workstation, intelligent device or the like, the software in the memory 520 may further include a basic input output system (BIOS) (omitted for simplicity). The BIOS is a set of essential software routines that initialize and test hardware at startup, start the O/S 550, and support the transfer of data among the hardware devices. The BIOS is stored in some type of read-only-memory, such as ROM, PROM, EPROM, EEPROM or the like, so that the BIOS can be executed when the computer 500 is activated.

When the computer 500 is in operation, the processor 510 is configured to execute software stored within the memory 520, to communicate data to and from the memory 520, and to generally control operations of the computer 500 pursuant to the software. The application 560 and the O/S 550 are read, in whole or in part, by the processor 510, perhaps buffered within the processor 510, and then executed.

When the application 560 is implemented in software it should be noted that the application 560 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 560 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 560 is implemented in hardware, the application 560 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include mounting of a relatively large, lightweight mirror for use in a telescope in space with minimal distortion.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for mounting a mirror for use in a telescope, the method comprising:
    attaching the mirror to a plurality of adjustable mounts;
    determining a distortion in the mirror caused by the plurality adjustable mounts, and, if the distortion is determined to be above a predetermined level:
        adjusting one or more of the adjustable mounts; and
        determining the distortion in the mirror caused by the adjustable mounts; and
    in the event the determined distortion is determined to be at or below the predetermined level, rigidizing the adjustable mounts.

2. The method of claim 1, wherein determining the distortion comprises a full-aperture vertical interferometer test of the mirror.

3. The method of claim 2, wherein the full-aperture vertical interferometer test comprises a computer generated hologram used as a null lens.

4. The method of claim 2, further comprising performing a full-aperture horizontal interferometer test of the mirror.

5. The method of claim 4, further comprising performing a sub-aperture horizontal interferometer test of the mirror.

6. The method of claim 5, further comprising determining a sag due to gravity in the mirror based on a result of the full-aperture horizontal interferometer test and the sub-aperture interferometer horizontal test.

7. The method of claim 6, further comprising subtracting the determined sag from a result of the full-aperture vertical interferometer test of the mirror to determine the distortion caused by the adjustable mounts.

8. The method of claim 1, further comprising performing a vibration test of the mirror and the rigidized mounts.

9. The method of claim 1, wherein the plurality of adjustable mounts comprise a plurality of ball and socket joints connected to a plurality of mounting pads located on the surface of the mirror, and adjusting one or more of the adjustable mounts comprises adjusting one or more of the ball and socket joints.

10. The method of claim 9, wherein the plurality of mounting pads are attached to the mirror by a plurality of screws, and adjusting one or more of the adjustable mounts comprises adjusting a tightness of one or more of the screws.

11. A system for mounting a mirror for use in a telescope, comprising:
    a plurality of adjustable mounts attached to the mirror;
    an interferometer configured to determine a distortion in the mirror caused by the plurality adjustable mounts;
    wherein one or more of the plurality of adjustable mounts are configured to be adjusted in the event the distortion is determined to be above a predetermined level, and the plurality of adjustable mounts are configured to be rigidized in the event the determined distortion is determined to be at or below the predetermined level.

12. The system of claim 11, wherein the interferometer is configured to perform a full-aperture vertical interferometer test of the mirror.

13. The system of claim 12, further comprising a computer generated hologram configured for use as a null lens.

14. The system of claim 12, further comprising an interferometer configured to perform a full-aperture horizontal test of the mirror.

15. The system of claim 14, further comprising an interferometer configured to perform sub-aperture horizontal test of the mirror.

16. The system of claim 15, wherein a sag due to gravity in the mirror is determined based on a result of the full-aperture horizontal test and the sub-aperture horizontal test.

17. The system of claim 16, wherein the determined sag is subtracted from a result of the full-aperture vertical test of the mirror to determine the distortion caused by the plurality of adjustable mounts.

18. The system of claim 1, wherein the plurality of adjustable mounts comprise a plurality of ball and socket joints connected to a plurality of mounting pads located on the surface of the mirror, and one or more of the ball and socket joints are configured to be adjusted in the event the distortion is determined to be above a predetermined level.

19. The system of claim 18, wherein the plurality of mounting pads are attached to the mirror by a plurality of screws, and a tightness of one or more of the screws are configured to be adjusted in the event the distortion is determined to be above a predetermined level.

20. A computer program product comprising a computer readable storage medium containing computer code that, when executed by a computer, implements a method for mounting a mirror for use in a telescope, the mirror being attached to a plurality of adjustable mounts, wherein the method comprises:
  determining a distortion in the mirror caused by the plurality adjustable mounts, and, if the distortion is determined to be above a predetermined level:
    adjusting one or more of the adjustable mounts; and
    determining the distortion in the mirror caused by the adjustable mounts; and
  in the event the determined distortion is determined to be at or below the predetermined level, issuing a command to rigidize the adjustable mounts.

* * * * *